United States Patent Office 3,641,051
Patented Feb. 8, 1972

3,641,051
NAPHTHYLENE-BIS-2-BENZIMIDAZOLES
Hans Frischkorn, Hofheim, Taunus, Ulrich Pintschovius, Kelkheim, Taunus, Erich Schinzel, Hofheim, Taunus, and Otto Smerz, Kelkheim, Taunus, Germany, assignors to Farbwerke Hoechst Aktiengesellschaft vormals Meister Lucius & Brüning, Frankfurt am Main, Germany
No Drawing. Filed July 9, 1968, Ser. No. 743,337
Claims priority, application Germany, July 12, 1967, F 52,933
Int. Cl. C07d 49/38
U.S. Cl. 260—309.2        14 Claims

ABSTRACT OF THE DISCLOSURE

Naphthalene-bis-2-benzimidazoles, especially 1,4-naphthalene-bis-2'-benzimidazoles, are excellent optical brighteners, particularly for fibrous materials, especially for those made of polyacrylonitrile. The new compounds are useful for brightening in combination with oxidative bleaching agents in acid baths.

---

The present invention relates to new colourless or almost colourless fluorescent imidazole compounds of the general Formula I

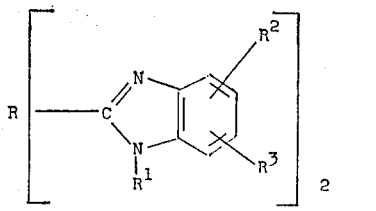

(I)

in which R stands for a naphthylene radical, $R^1$ is a hydrogen atom, an alkyl group with preferably 1 to 4 carbon atoms, which may be substituted, for example, by a hydroxy or cyano group, an aryl group, preferably a phenyl group, or an aralkyl group, preferably a benzyl group, and $R^2$ and $R^3$ each represent a hydrogen atom, a halogen atom, for example, fluorine or preferably chlorine, an alkyl group with preferably 1 to 4 carbon atoms, an aryl group, preferably a phenyl group, an alkoxy group with preferably 1 to 4 carbon atoms, or a carboxylic or sulfonic acid group or their functional derivatives, or $R^2$ and $R^3$ taken together represent an alkylene radical with 3 or 4 carbon atoms or a condensed aromatic radical preferably a benzene nucleus; the present invention also relates to a process for making the above compounds and to their use as optical brighteners.

It has already been proposed to use derivatives of benzimidazole as optical brighteners. In the literature, $\alpha,\beta$-bis-[benzimidazolyl-(2')]-ethylene compounds which may carry various substituents have been described, for example, as brighteners for detergents (see German Pat. 848,069).

Now we have found that colourless or almost colourless fluorescent imidazole compounds of the general Formula I

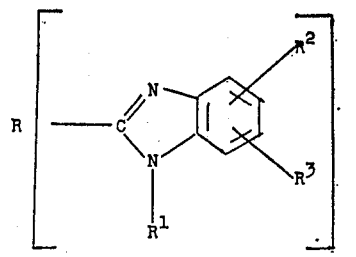

(I)

in which R, $R^1$, $R^2$ and $R^3$ have the meanings given above, can be obtained by (a) Reacting 1 mol of a naphthalene dicarboxylic acid, preferably naphthalene dicarboxylic acid-(1,4) or a functional carboxylic acid derivative thereof, for example, a nitrile, acid chloride or ester, for example an alkyl or phenyl ester thereof, with 2 mols or an amount slightly in excess thereof of an aromatic o-diamino compound of the general Formula II

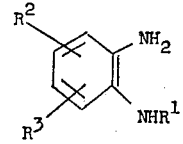

(II)

in which $R^1$, $R^2$ and $R^3$ have the meanings given above, in the presence of a catalyst at a temperature within the range of about 100 to about 250° C., advantageously about 160 to about 220° C., with the exclusion of oxygen; or (b) Reacting 1 mol of the dichloride of a naphthalene dicarboxylic acid, advantageously of naphthalene dicarboxylic acid-(1,4), with 2 mols or an amount slightly in excess thereof of an aromatic o-nitramine derivative of the general Formula III

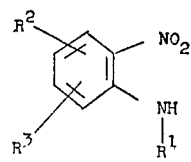

(III)

in which $R^1$, $R^2$ and $R^3$ have the meanings given above, and after reduction of the two nitro groups, subjecting the o-aminoarylamide of the naphthalene dicarboxylic acid of the general Formula IV

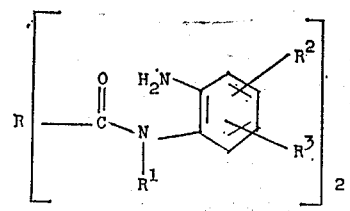

(IV)

in which R, $R^1$, $R^2$, and $R^3$ have the meanings given above, to an imidazole ring closure, preferably in the presence of a catalyst; and converting, if desired, the imidazole compound of the above Formula I obtained by proceeding as described sub (a) or (b), into the corresponding compounds with a tertiary nitrogen atom if $R^1$ is hydrogen.

The benzimidazole ring closure is brought about by merely heating the o-aminoarylides of naphthalene dicarboxylic acid of the above Formula IV to a temperature above their melting point. It is advantageous, however, to carry out this reaction under nitrogen in the presence of a catalyst, for example polyphosphoric acid and/or glacial acetic acid, at a temperature within the range of from about 100 to about 250° C., preferably from about 160 to about 220° C.

The naphthalene dicarboxylic acids to be used in the process of the invention may be unsubstituted, for example, 1,4-naphthalene-dicarboxylic acid or 2,6-naphthalene-dicarboxylic acid, or they may be substituted by non-chromophoric radicals, for example, halogen atoms, advantageously chlorine or bromine atoms, alkyl-, alkoxy-, amino-, alkylamino-, dialkylamino-, acylamino- or carboxylic or sulfonic acid groups or the functional derivatives thereof.

Examples of suitable aromatic o-diamino compounds of Formula II are:

o-phenylenediamine,
2,3-diaminotoluene,
3,4-diaminotoluene,
3,4-diaminoethylbenzene,
3,4-diamino-tert. butylbenzene,
4,5-diamino-1,2-dimethylbenzene,
2,3-diaminobenzoic acid-ethyl ester,
4,5-diaminobenzene-1-sulfonamide,
2,3-diaminobenzonitrile,
3,4-diaminobenzene-1-sulfonic acid-phenyl ester,
3,4-diamino-1,2-dimethylbenzene,
4,5-diamino-1,3-dimethylbenzene,
4-chloro-1,2-diaminobenzene,
6-chloro-3,4-diaminotoluene,
3,4-diaminodiphenyl,
1,2-diamino-5,6,7,8-tetrahydronaphthalene,
2,3-diamino-5,6,7,8-tetrahydronaphthalene,
4,5-diaminoindan,
5,6-diaminoindan,
1,2-diaminonaphthalene,
2,3-diaminonaphthalene,
2-amino-N-methylaniline,
2-amino-diphenylamine,
2-amino-1-benzylaminobenzene.

As aromatic o-nitramine derivatives of Formula III there may be used, for example, o-nitraniline,
3-nitro-4-aminotoluene,
3-nitro-4-amino-tert.butylbenzene,
5-nitro-4-amino-1,2-xylene,
3-nitro-4-amino-1,2-xylene,
5-chloro-2-nitraniline,
4-chloro-2-nitraniline,
6-chloro-3-nitro-4-aminotoluene,
3-nitro-4-aminodiphenyl,
3-nitro-4-aminoanisole,
3-nitro-4-aminophenetole,
2-nitro-N-methylaniline,
4-chloro-2-nitro-N-methyl-aniline,
4-chloro-2-nitro-diphenylamine and
2-nitro-1-benzylaminobenzene.

The compounds of Formula I obtained by the process in accordance with the invention have excellent fluorescence properties and are very suitable as optical brighteners.

Used in the form of an acidic solution or of a dispersion, the compounds of the invention make excellent brighteners of good fastness to light for fibrous materials, especially those of polyacrylonitrile or copolymers of polyacrylonitrile. Particularly high degrees of whiteness are obtained with these brighteners at temperatures within the range of from about 90 to about 130° C., advantageously from about 95 to about 105° C., in the presence of oxidative bleaching agents, for example sodium chlorite. The products in accordance with the invention are preferably used under the above conditions in an acid pH range, advantageously at a pH within the range of from about 2 to about 5. The products of the invention have the particular adavntage that the brightening effect is little influenced by variations of the pH in the indicated range. This property renders the compounds particularly valuable for practical use in combination with oxidative bleaching agents, for example sodium chlorite. The products of the invention are in this respect superior to the products hitherto known for this field of application.

The aqueous dispersions of the products in accordance with the invention may be prepared, if desired, with the help of a dispersing agent. The amounts in which the brighteners in accordance with the invention have to be added to obtain an optimum degree of whiteness can easily be determined by preliminary tests and are generally within the range of from about 0.005 to about 2%, advantageously from about 0.01 to about 1%.

The products in accordance with the invention may also be added to spinning or casting masses for the manufacture of synthetic fibres, filaments, films or other shaped articles.

The following examples serve to illustrate the invention but are not intended to limit it; the parts being by weight unless otherwise stated.

EXAMPLE 1

21.6 parts of naphthalene-1,4-dicarboxylic acid and 28 parts of 4,5-diamino-1,2-dimethylbenzene were heated, while stirring, within 1 hour under nitrogen togther with 200 parts of polyphosphoric acid to a temperature of 200° C. and stirring was continued at that temperature for a further 3 hours. A homogeneous mass was obtained. The mass was allowed to cool to 110 to 120° C. and about 500 parts by volume of water having a tempearture of 80 to 90° C. were then added dropwise whereby a precipitate was formed with a temporary increase in temperature. The mass was diluted with a further 500 parts by volume of cold water and cooled to room temperature and the precipitated product was filtered with suction. The product was washed with water until neutral to Congo paper and dried at a temperature within the range of 80 to 100° C. A yellowish crude product was obtained. The latter was purified by dissolving it in dimethylformamide, adding charcoal, filtering at elevated temperatu;re and adding methanol to the filtrate at about 100° C. After cooling, the precipitate was filtered with suction and the product obtained was again stirred for 30 minutes at the boil with 500 parts by volume of water, filtered with suction at elevated temperature and washed with about 500 parts by volume of hot water. After drying at 80 to 100° C. 38.5 parts of 1,4 - bis - [5',6' - dimethylbenzimidazolyl-(2')]-naphthalene (VIII, table) were obtained in the form of a yellowish powder melting at 376 to 380° C.

EXAMPLE 2

36 parts of 1,4-dicyano-naphthalene and 46 parts of o-phenylene-diamine were heated, while stirring, within 1 hour under nitrogen with 200 parts of polyphosphoric acid to a temperature within the range of from 200 to 210° C. and stirring was continued at that temperature for a further 2 hours. A homogeneous mass was obtained. The mass was allowed to cool to 110 to 120° C., 250 parts by volume of water having a temperature of 80 to 90° C. were added dropwise and the whole was poured onto a further 1500 parts by volume of cold water whereby a coarsely crystalline greenish precipitate formed. The latter was filtered with suction, washed with water and dissolved at the boil in a mixture of 2 N-sodium hydroxide solution and ethyl alcohol. After the addition of charcoal, the whole was filtered at elevated temperature and the filtrate was diluted with water and cooled to room temperature. The precipitated 1,4-bis-[benzimidazolyl-(2')]-naphthalene (V, table) was filtered with suction and washed with water until neutral. After drying, 29 parts of an almost colourless powder were obtained which melted at 408 to 412° C.

EXAMPLE 3

21 parts of compound VIII (Example 1) were dissolved at elevated temperature in a mixture of 500 parts by volume of 1 N-sodium hydroxide solution and 1000 parts by volume of dioxane. A yellow, greenishly fluorescent solution was obtained. This solution was cooled to 50° C., 32 parts of methyl iodide were added and the whole was heated under reflux for 30 minutes, cooled again to 50° C., a further 16 parts methyl iodide was added and the whole was boiled under reflux for 1 hour. An almost colourless, bluishly fluorescent solution as obtained. The solution was cooled and diluted with 2000 parts by volume of water, the precipitated product was filtered with suction and washed with water until neutral. After drying, 20.5 parts of crude 1,4-bis-[1',5',6'-trimethylbenzimidazolyl-(2')]-naphthalene (IX, table) melting at 351 to 355° C. were obtained. The compound could be further purified by dissolution in ethyl alcohol, clarification with the addition of charcoal and precipitation with water. A colourless product melting at 354 to 356° C. was obtained.

When ethyl iodide was used instead of methyl iodide, while otherwise proceeding in the same manner, compound X (table) melting at 309 to 310° C. (from toluene) was obtained.

EXAMPLE 4

21 parts of compound VIII (Example 1) were dissolved at elevated temperature in a mixture of 500 parts by volume of 1 N-sodium hydroxide solution and 1000 parts by volume of dioxane. A yellowish, greenishly fluorescent solution was obtained. 11 parts of benzylbromide were added and the mixture was heated under reflux for a further hour, a colourless, bluishly fluorescent solution being obtained. After cooling, the solution was diluted with 2000 parts by volume of a 10% potassium chloride solution in water. The whole was allowed to stand overnight, the product which had precipitated was then isolated, triturated with the addition of water, filtered with suction and washed with water until neutral. After drying, 23 parts of crude 1,4-bis-[1'-benzyl-5',6'-dimethyl-benzimidazoyl-(2')]-naphthalene (XI, table) were obtained which after repeated recrystallization from benzene and toluene, respectively, had a melting point of 287 to 289° C.

EXAMPLE 5

From 21.6 parts of naphthalene-1,4-dicarboxylic acid and 28 parts of thionyl chloride the dichloride was prepared in 78 parts of toluene. After removing the excess amount of thionyl chloride, the acid chloride solution in toluene (50 parts by volume of toluene) was added dropwise, while stirring, at the boil, to a solution of 35 parts of 5-chloro-2-nitraniline (99% strength) in 88.5 parts of acetone and 23 parts of dimethylaniline and the whole was allowed to react for a further 5 hours at 60° C. The reaction mixture was distilled with steam and the precipitate was filtered with suction from the residue and washed with dilute hydrochloric acid and water. After drying, 52 parts of the yellow acylamino compound melting at 240 to 246° C. were obtained.

52 parts of the above acylamino compound were reduced in 380 parts of dimethylformamide with hydrogen at a temperature of 90° C. under a pressure of 100 atmospheres hydrogen in the presence of 10 parts of nickel catalyst. The bulk of the dimethylformamide was distilled off in vacuo and the product was precipitated with water. 44 parts of a brown powder melting at 187 to 188° C. (under decomposition) were obtained.

By boiling for 1½ hours with 150 parts of glacial acetic acid, the benzimidazole ring closure was produced. After the bulk of acetic acid had been distilled off under reduced pressure, ammonia was added to the residue until a pH of 8 was obtained. The brown precipitate was filtered with suction and thoroughly washed with water. The dried crude product (36 parts) was taken up in 3000 parts by volume of hot acetone. After the addition of 2 parts of charcoal, the insoluble by-products were filtered off at elevated temperature. 2200 parts by volume of acetone were distilled from the filtrate. The yellow crystals obtained in the cold were filtered with suction and recrystallized three times from dioxane with the addition of charcoal. The 1,4 - bis - [5'-chloro-benzimidazolyl-(2')]-naphthalene (XII, table) so obtained was a yellowish crystalline powder having a decomposition point of 352 to 354° C. (darkening) and a transformation point of 225 to 235° C.

EXAMPLE 6

11 parts of naphthalene-2,6-dicarboxylic acid of 98% strength and 20 parts of thionyl chloride were reacted in 76 parts by volume of toluene in the presence of 0.2 part of hexamethyl-phosphoric acid triamide to obtain the acid chloride. After removing the excess amount of thionyl chloride with the help of nitrogen, the acid chloride solution in toluene was run at about 60° C. into a solution of 14 parts of o-nitraniline, 13 parts of dimethylaniline and 90 parts of acetone and the whole was stirred for another 5 hours at 60° C. 20.5 parts of a yellow powder melting at 300 to 303° C. were obtained.

18.2 parts of the above intermediate product were reduced in 143 parts of dimethylformamide with hydrogen at a temperature of 70° C. under a pressure of 70 atmospheres hydrogen in the presence of 4 parts of nickel catalyst. After the product had been freed from the catalyst by suction filtration at elevated temperature, the filtrate was concentrated in vacuo and the reaction product was precipitated with water. 14.7 parts of an ocher-brown powder of a decomposition point of above 415° C. were obtained.

14.7 parts of the o-amino-acylamino compound were boiled under reflux for 1 hour with 100 parts of glacial acetic acid. After cooling, the product was filtered with suction and washed with water. After drying, 11 parts of crude product were obtained, which were purified by dissolving them in dimethyl sulfoxide and treatment with charcoal and precipitation with water. The 2,6-bis-[benzimidazolyl-(2')]-naphthalene so obtained was a yellowish powder melting at a temperature above 430° C.

EXAMPLE 7

From 11 parts of naphthalene-2,6-dicarboxylic acid of 98% strength the acid chloride was prepared as described in Example 6 and the latter was added dropwise, while stirring, at about 60° C. to a solution of 15.5 parts of 2-nitro-N-methylaniline and 13 parts of dimethylaniline in 80 parts of acetone. After boiling under reflux for 5 hours the yellow precipitate was filtered with suction at 5° C., treated with steam, filtered with suction again, washed with water and dried. 17.9 parts of a yellowish powder melting at 271 to 276° C. were obtained.

17.8 parts of the acylamino compound so obtained were stirred with 450 parts of glacial acetic acid and 40 parts of zinc dust and the whole was heated at the boil for 40 minutes. After the residual zinc had been filtered with suction at elevated temperature, the filtrate was diluted with its volume of water, introduced into a mixture of 545 parts of ammonia of 25% strength and 630 parts of water, heated for a short time at the boil, cooled and filtered with suction. After drying, 12.8 parts of crude 2,6-bis-[1'-methtylbenzimidazolyl-(2')]-naphthalene were obtained which after recrystallization from dimethylformamide were obtained in the form of colourless small leaves melting at 318 to 319° C.

In a manner analogous to that described in the above examples the compounds enumerated in the following table could be obtained:

TABLE

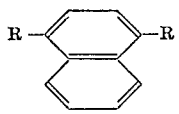

| Constitution | | Melting point (°C.) |
|---|---|---|
| V | $R'=$ [benzimidazole structure] | 408 to 412. |
| VI | $R'=CH_3$ [benzimidazole structure] | 328 to 330.[a] |
| VII | $R'=CH_3$, $CH_3$ on ring [benzimidazole structure] | 347 to 352.[b] |
| VIII | $R'=CH_3$, $CH_3$ [benzimidazole structure] | 376 to 380. |
| IX | $R'=CH_3$, $CH_3$ [benzimidazole, N-$CH_3$] | 354 to 356. |
| X | $R'=CH_3$, $CH_3$ [benzimidazole, N-$C_2H_5$] | 309 to 310. |
| XI | $R'=CH_3$, $CH_3$ [benzimidazole, N-$CH_2C_6H_5$] | 287 to 289. |
| XIII | $R'=Cl$ [benzimidazole structure] | 352 to 354 (decomposition).[a] |

[a] Due to the tautomeric mobility of the hydrogen atom at the nitrogen atom in the ring, the 6'-isomer may also be obtained.
[b] Due to the tautomeric mobility of the hydrogen atom at the nitrogen atom in the ring, the 6',7'-dimethyl derivative may also be obtained.

EXAMPLE 8

A fabric of a synthetic fiber containing at least 85% polyacrylonitrile was treated, with a goods to liquor ratio of 1:20, in a bleaching bath containing, per liter,

| | Gram |
|---|---|
| Sodium chlorite (100% strength) | 0.6 |
| Sodium pyrophosphate | 0.5 |
| Glacial acetic acid | 0.2 |
| Compound of Formula V | 0.04 |

The pH of the bath had been adjusted to 3.5 with sulfuric acid. The process was carried out for 30 minutes at a temperature of 80 to 85° C. and then for a further 30 minutes at 98° C.

Samples of fabric thus treated had a considerably improved whiteness as compared with a fabric which had been bleached only with sodium chlorite without the concomitant use of the optical brightener of Formula V. The same observations were made in samples which had been treated at a pH of 2. No appreciable difference was found between the samples bleached at pH 3.5 and those bleached at pH 2.

EXAMPLE 9

A fabric of a synthetic fiber containing at least 85% polyacrylonitrile was treated, with a goods to liquor ratio of 1:20, in a bleaching bath containing, per liter,

| | Gram |
|---|---|
| Sodium chlorite (100% strength) | 0.6 |
| Sodium pyrophosphate | 0.5 |
| Glacial acetic acid | 0.2 |
| Compound of Formula VI | 0.01 |

The bath had been adjusted to a pH of 2.5 with sulfuric acid. The process was carried out for 30 minutes at a temperature of 80 to 85° C. and then for a further 30 minutes at 98° C.

Samples of the fabric thus treated had a considerably improved whiteness as compared with a sample bleached only with sodium chlorite without the concomitant use of the optical brightener of Formula VI. The same observations were made in samples treated at pH 3.5. No appreciable difference was found between the samples treated at pH 3.5 and those treated at pH 2.5.

What is claimed is:

1. A compound of the formula

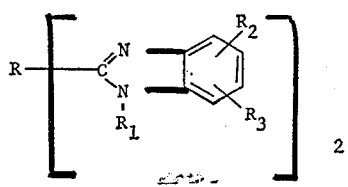

wherein R is naphthylene, $R_1$ is hydrogen, lower alkyl or benzyl, and $R_2$ and $R_3$ each is hydrogen, chlorine, lower alkyl, lower alkoxy, phenyl, carboxylic acid, carboxylic acid lower alkyl ester cyano, sulfonic acid, sulfonic acid amide, sulfonic acid lower alkyl ester, sulfonic acid phenyl ester or $R_2$ and $R_3$ together are 1,3-propylene, 1,4-butylene or o-phenylene.

2. A compound as defined in claim 1 wherein $R_2$ is hydrogen and $R_3$ is chlorine.

3. A compound as defined in claim 1 wherein $R_2$ is hydrogen and $R_3$ is lower alkyl.

4. A compound as defined in claim 1 wherein $R_2$ is hydrogen and $R_3$ is methyl.

5. A compound as defined in claim 1 wherein $R_2$ and $R_3$ each is methyl.

6. A compound as defined in claim 1 wherein $R_2$ and $R_3$ each is hydrogen.

7. A compound as defined in claim 1 wherein said R is 1,4-naphthylene.

8. A compound as defined in claim 1 wherein said R is 2,6-naphthylene.

9. The compound of the formula

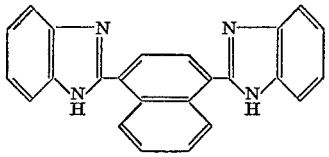

10. The compound of the formula

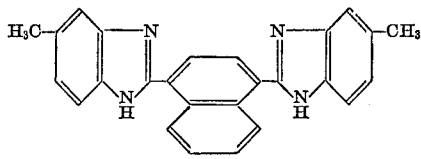

11. The compound of the formula

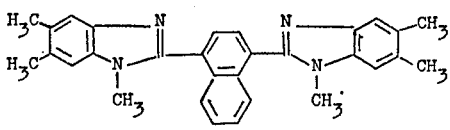

12. The compound of the formula

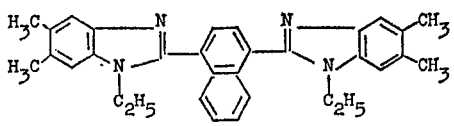

13. The compound of the formula

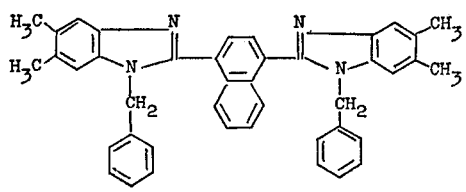

14. The compound of the formula

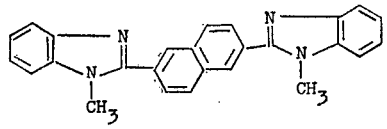

References Cited

UNITED STATES PATENTS

| | | | |
|---|---|---|---|
| 2,808,407 | 10/1957 | Ackermann et al. | 260—240 |
| 2,878,248 | 3/1959 | Crounse | 260—240 |
| 2,985,661 | 5/1961 | Hein et al. | 260—309.2 |
| 3,076,812 | 2/1963 | Ackermann et al. | 260—307 |
| 3,095,421 | 6/1963 | Liechti et al. | 260—304 |

FOREIGN PATENTS

| | | | |
|---|---|---|---|
| 6,409,237 | 4/1965 | Netherlands | 260—309.2 |
| 6,505,474 | 11/1965 | Netherlands | 260—307 |
| 1,218,058 | 5/1960 | France | 260—307 |

HENRY R. JILES, Primary Examiner

G. T. TODD, Assistant Examiner

U.S. Cl. X.R.

106—193 D; 117—33.5 R; 252—301.2 W; 260—37 N, 41 C, 558 R